April 18, 1967  P. A. HERSCH ETAL  3,314,863
GAS ANALYSIS
Filed Sept. 16, 1963

INVENTOR.
PAUL A. HERSCH
BY RUDOLF DEURINGER

ATTORNEY

United States Patent Office 3,314,863
Patented Apr. 18, 1967

3,314,863
GAS ANALYSIS
Paul A. Hersch, Fullerton, and Rudolf Deuringer, Garden Grove, Calif., assignors to Beckman Instruments, Inc., a corporation of California
Filed Sept. 16, 1963, Ser. No. 309,015
9 Claims. (Cl. 204—1)

This invention relates to gas analysis and, more particularly, to an improved galvanic monitoring process and apparatus for the continuous analysis of traces of oxides of nitrogen in a sample of air or in other gases.

One of the most aggressive components of polluted air is $NO_2$. In order that dangerous levels of this noxious compound may be known and corrective measures may be taken, means are required for determining the amount of $NO_2$ in the air. The most widely accepted means for monitoring $NO_2$ is an elaborate procedure based upon the ability of $NO_2$ to couple aniline derivatives with aromatic compounds in aqueous solution to form highly colored products, which, by the depth of their color, indicate the amount of $NO_2$ in the gas sample. This generally used colorimetric principle demands, however, complex equipment to translate the color into an electrical signal, and provisions for the controlled addition and disposal of the spent reagents. Moreover, the signal developed by this process follows changes of $NO_2$ concentration quite slowly. Thus, what is needed is a simple and inexpensive means for determining low concentrations of $NO_2$ in the air, or in other gas samples, which has high sensitivity and quick response.

It is, therefore, the principal object of the present invention to provide a simple and inexpensive method and apparatus for measuring $NO_2$ continuously at low concentration levels.

Another object of the invention is to provide an electrochemical method and apparatus for measuring $NO_2$ which does not require any moving parts nor any continual or intermittent renewal of electrolyte.

Still a further object of the invention is to provide an electrochemical method and apparatus for determining $NO_2$ in a gas sample which does not require an external electromotive force.

A further object of the invention is to provide means for continuously measuring low concentrations of nitric oxide.

According to the principal aspect of the invention, $NO_2$ is carried in a sample gas stream to a galvanic cell which is provided with an anode of active carbon or, in certain cases, silver, and a platinum cathode joined to the anode by an electrolyte. When the $NO_2$ passes along the platinum cathode, the carbon anode is electrochemically oxidized. The free energy of oxidation of the carbon anode coupled with the reduction of the $NO_2$ to $NO$, is converted into electrical energy. The current generated in the cell is a measure of the rate of supply of the $NO_2$.

According to another aspect of the present invention, trace amounts of nitric oxide in a gas stream may be determined by first reacting the nitric oxide with a suitable substance to convert it into $NO_2$ and, thereafter, the $NO_2$ is delivered to the galvanic cell of this invention to provide a measure of the concentration of $NO_2$ and, thus, of the original nitric oxide.

Other objects, aspects and advantages will become apparent from the following description taken in connection with the accompanying drawing wherein.

Figures 1, 2, 3:
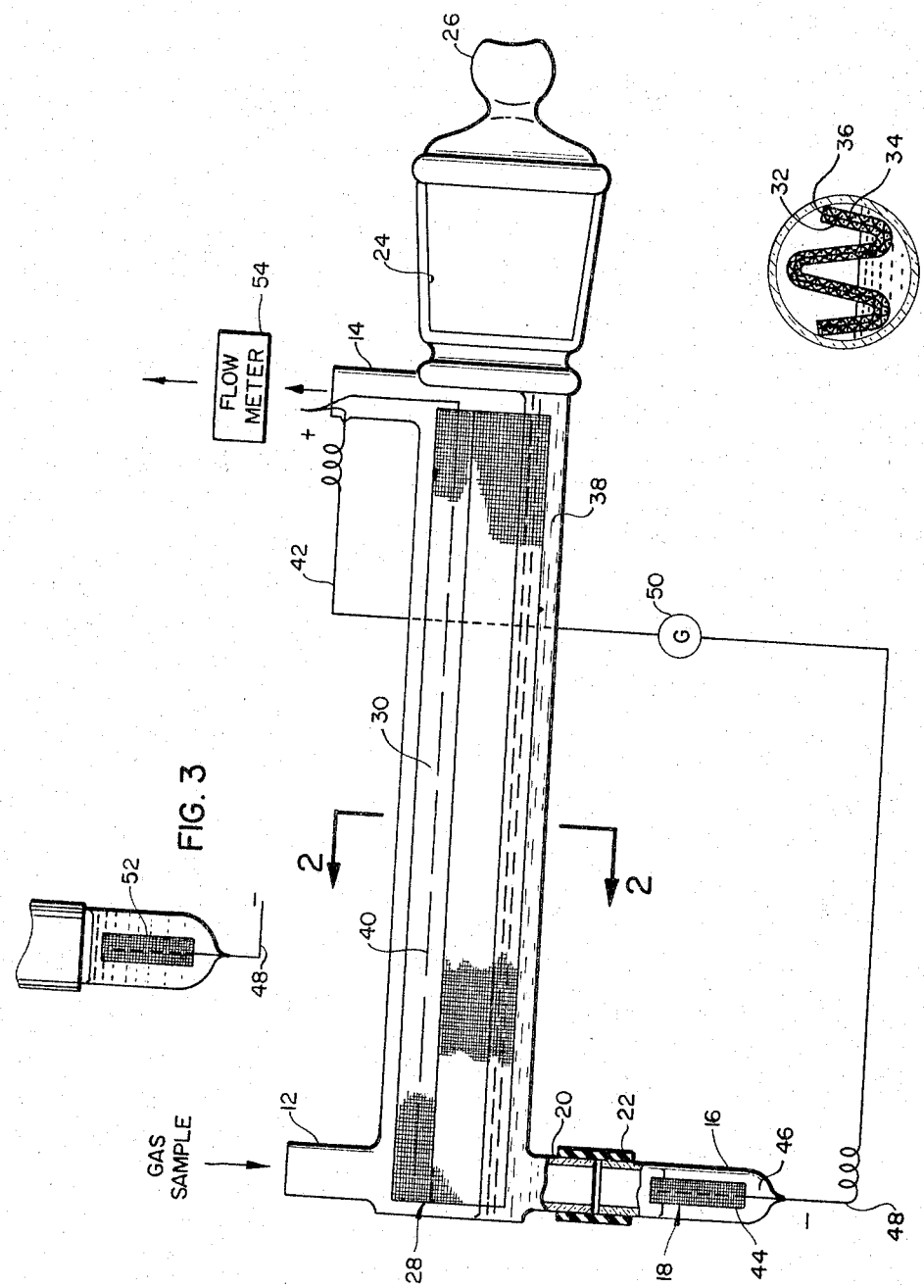
FIG. 1 is a side view, partially in section, of the galvanic cell of the present invention.
FIG. 2 is a sectional view taken along line 2—2 of FIG. 1.
FIG. 3 is a side view of the anode compartment of an embodiment of the galvanic cell shown in FIG. 1.

Referring now to the drawing in detail, FIG. 1 shows the apparatus of the invention which comprises a horizontally disposed glass cell or receptacle 10 having a gas sample inlet port 12 at one end thereof opening through the top portion of the cell and a second outlet port 14 at the upper end of the opposite end of the cell. At the lower side of the cell, there is provided a vertical, detachable compartment 16 which houses the anode of the cell, generally designated by numeral 18. The compartment 16 is connected to a stem 20 depending from the lower portion of the cell by means of a suitable plastic sleeve 22. At the end of the cell adjacent the outlet port 14 there is provided a port 24 closed by a suitable stopper 26. The port 24 provides access to the interior of the cell so that the cathode 28 may be placed in the cell.

The cathode of the cell comprises an elongated laminated structure folded upon itself several times as shown in FIG. 2 to provide a plurality of surfaces over which the gas sample may pass. The laminated structure 30 preferably comprises two sheets or layers of platinum screen 32 and 34 separated by an intermediate layer of liquid absorbent material 36, preferably a material like blotting paper or glass paper. The laminated structure 30 is disposed in the cell so that the majority of the folds of the structure are disposed substantially vertically. Thus, only the lower portion of the cathode is submerged in a neutral buffered electrolyte 38 in the lower portion of the cell 10. A platinum wire 40 is threaded through the laminated structure 30 and leads to another platinum wire 42 which passes through the port 14 for connection to an electrical circuit. An epoxy resin mixture may be used to seal wire 42 into the opening through which it passes in the port 14.

The anode of the invention preferably comprises a platinum screen 44 almost totally submerged in a sludge of active carbon 46. The active carbon may be made by working the carbon into a suitable electrolyte. It is an essential feature of the invention that the carbon 46 be active, that is, it must participate in the chemical reaction occurring in the cell and not merely conduct electrically. The carbon 46 should have a large, reactive surface and the particles, when forming a bed without compression, should have enough contact with each other to ensure conductive continuity throughout the bed. It is preferable that the platinum screen 44 emerge from the carbon sludge to facilitate the escape of hydrogen should a cathodic "charging" of the carbon becomes desirable after prolonged use of the cell. Without some emerging area of the platinum, hydrogen bubbles could evolve inside the carbon bed and disrupt the bed during such charge. A conductor 48 electrically connects the platinum screen 44 of the anode to one terminal of a current measuring device 50 while the wire 42 connected to the cathode 28 is connected to the opposite terminal of the current measuring device 50. Generally, the current measuring device is a galvanometer. However, the conductors 42 and 48 could be connected to a resistor, in which case the current is measured in terms of the potential drop along the resistor by a voltmeter. In most cases, no electronic amplification is required other than that built into a conventional millivolt recorder.

A silver anode rather than the carbon anode 18 may be provided when there are high levels of $NO_2$ in the gas sample and when the current drain is high. Such an anode is illustrated in FIG. 3 and comprises a silver screen 52 which is connected to the platinum wire 48 as in the case of the carbon anode 18. The ability of the carbon anode to oxidize is limited and the anode may reach this limit early in continuous use if the drain is excessive. The silver anode 52, for all practical purposes, never gives out and, therefore, in some cases may be more suitable. However, silver has the disadvantage that it produces a background current that has to be deducted from the signal, and may render the signal "noisy."

To complete the apparatus of the present invention there is included a flowmeter 54 at the outlet port 14 of the cell to measure the flow of the gas sample passing through the cell, which value is necessary in determination of the $NO_2$ content of the sample stream.

A preferred electrolyte composition for use in cell 10 comprises:

| | Mol/liter of solution |
|---|---|
| Potassium chloride | 3 |
| Potassium di-hydrogen phosphate | 0.1 |
| Di-sodium hydrogen phosphate | 0.1 |

The potassium salts may be replaced by the corresponding sodium or ammonium salts. The purpose of the phosphates in the electrolyte is to buffer off acidity which is a product of the anodic reaction in the cell. A slow build-up of acidity would be detrimental to stability of output of the cell.

In operation of this apparatus, the gas sample stream is passed through the port 12, over the cathode 28 in the cell 10, and is exhausted through the port 14 by means of a pump (not shown) either at the inlet or outlet ends of the cell. Since the absorbent material 36 partially submerged in the electrolyte acts as a wick, the platinum screens 32 and 34 are substantially wetted with a thin film of electrolyte thus facilitating the access of the $NO_2$ to the platinum. When the $NO_2$ in the gas sample contacts the unsubmerged portion of the platinum screen of the cathode 28, a portion of the number of $NO_2$ molecules is reduced to NO in accordance with the equation

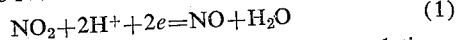
$$NO_2 + 2H^+ + 2e = NO + H_2O \quad (1)$$

This cathodic reaction is catalyzed by the platinum screens. The remainder of the $NO_2$ molecules in the sample will be involved in a second, purely chemical, hydrolytic reaction which is undesirable for maximizing the output of the cell. The second reaction is

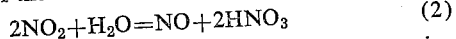
$$2NO_2 + H_2O = NO + 2HNO_3 \quad (2)$$

Thus, by constructing the cell so that the major portion of the platinum cathode is unsubmerged in the electrolyte, the probability of Reaction 1 occurring is maximized and the probility of Reaction 2 is minimized. Even so, only about one of every three molecules of $NO_2$ undergoes the change described by Reaction 1. The overall events occurring in the cell approximate the equation:

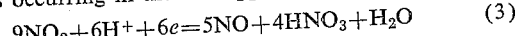
$$9NO_2 + 6H^+ + 6e = 5NO + 4HNO_3 + H_2O \quad (3)$$

During the reduction of the $NO_2$ at the cathode 28, the carbon anode 18 forms a surface oxide of ill-defined formula. When a silver anode 52 is utilized the anode will form a silver halide.

According to Reaction 3, each mol of $NO_2$ (that is, 24.05 liters at 20° C. and 760 mm. Hg.) moves ⅔ of a faraday, that is, ⅔ × 1609 ampere-minutes through the galvanometer 50. A gas stream of 0.1 liter/minute carrying one volume per million of $NO_2$ will thus produce a current of about 4.5μA. Since Reaction 3 is only approximately correct, the cell constant, around 4.5μA/0.1 liter/minute, should be accurately determined by calibration, and checked from time to time. This calibration requires a synthetic sample with a known content of $NO_2$ in the range of interest. A method for producing such a calibrating mixture by electrolysis, without requiring the storage of any gas, is described in our copending patent application Ser. No. 286,235 filed June 7, 1963, entitled, "Method and Apparatus for Producing Oxides of Nitrogen," assigned to the same assignee as the present application.

It is to be understood that the construction of the cell of the present invention illustrated in FIG. 1 is merely the preferred embodiment of the invention. However the cell could be somewhat modified and still be capable of detecting $NO_2$. For example, the cathode 28 could comprise merely a vertically disposed platinum screen without the additional layer of a liquid absorbent material 36. Such a screen would be somewhat wetted by the electrolyte 38 due to capillary forces and it is to be understood that it is not necessary that the entire platinum screen be covered with a film of electrolyte for the $NO_2$ to be reduced at the cathode. Also, the cell of the present invention could operate even if the entire cathode were submerged in electrolyte but there would be even a greater probability that Reaction 2 would occur rather than Reaction 1 since the $NO_2$ would have more opportunity to hydrolyze before reaching the cathode. Thus, for high yield and quick response in the cell, it is best that a minimum amount of the cathode be submerged in the electrolyte and the platinum screens be only slightly coated with electrolyte, which conditions favor the desired Reaction 1.

The method of determining $NO_2$ described so far also allows the indirect determination of nitric oxide, NO, the other odd-electron nitrogen oxide. This may be accomplished by first converting the NO into $NO_2$. We have found that this conversion may be readily made by passing a sample stream containing NO through a column of Chromosorb, a processed diatomee material, impregnated with chromic anhydride, $CrO_3$, and maintained at 180° C. The $NO_2$ thus formed can then be passed through the cell described above and determined by the current generated by the cell 10.

If the sample gas contains both $NO_2$ and NO, the NO does not interfere in the determination of $NO_2$. However, to determine NO in the presence of $NO_2$ the sample gas stream must first be routed through a column of Ascarite (sodium hydroxide carried on asbestos), which retains the $NO_2$. Then the sample stream is passed through a column of Chromosorb to convert the NO to $NO_2$ and finally the $NO_2$ is passed through the cell 10 of the present invention.

Occasionally it is desired to determine the concentration of $NO_2$ or NO in the atmosphere which also contains low traces of ozone. The ozone does not interfere in the determination of NO since the ozone is retained by Ascarite, but ozone does interfere in the determination of $NO_2$. However, in the presence of ozone the sum of the concentration of the oxides of nitrogen, NO and $NO_2$, can be determined. To this end one may route the sample stream through the column of Chromosorb impregnated with partly reduced chromic anhydride to destroy the ozone and thereafter pass the gas stream with the original and newly-formed $NO_2$ into the cell 10. Nitrogen dioxide may be determined in the presence of ozone by determining the total concentration of the two oxides, and the concentration of NO alone as described above, and then taking the difference between the two readings.

Sulfur dioxide is still another elements that occurs in the atmosphere and interferes in the determination of NO and NO$_2$. Sulfur dioxide may be removed from the sample and NO and NO$_2$ determined in the same manner as when the sample contains ozone as described above.

On occasion the concentration of NO$_2$ in a gas sample is too high for the cell 10 to give a linear response. However, high concentrations of NO$_2$ may be determined by utilizing a method of partial destruction, that is, the gas stream is divided into a minor stream which passes directly into the cell 10 and a major stream which passes through a column of active carbon and then to the cell. The active carbon destroys all of the NO$_2$ received in it. The cell 10 is then traversed by the full stream of gas sample but only by a fraction of the original NO$_2$, the fraction being the ratio flow rate of the minor stream to the total stream. By providing suitable flow constrictions in the ducts to the cell 10 and active carbon column, the ratio of the minor stream to the total stream of gas sample may, for example, be made 1/100, thus resulting in a hundred-fold dilution of the sample without the need of a diluent gas. The linear range of the cell may thus be extended a hundred fold.

It can be understood from the above description that the present invention is such simpler and more sensitive than the conventional techniques for determining of NO$_2$ and NO. The cell has a further advantage in that it is easy to manufacture, requires little maintenance, and may be made portable for use in the field.

Although several embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:

1. In a galvanic monitoring process for a gas stream containing NO$_2$, the steps comprising:
   providing a platinum cathode and an anode joined by a neutral buffered halide electrolyte with said cathode being only partly submerged in said electrolyte and said anode being formed of active carbon;
   conveying the gas stream directly to the unsubmerged portion of the cathode
   whereby the NO$_2$ in the gas stream is reduced at the cathode; and
   measuring the current across said electrodes without driving a current through said electrodes from an external electrical power source.

2. A galvanic monitoring process as set forth in claim 1 wherein said electrolyte comprises a mixture of chloride and phosphates.

3. In a galvanic monitoring process for a gas stream containing NO$_2$, the steps comprising:
   providing a cathode and an anode of active carbon joined by a neutral buffered electrolyte with said cathode being only partly submerged in said electrolyte, said cathode comprising a platinum screen in contact with a liquid-absorbent material;
   conveying the gas stream directly to the unsubmerged portion of the cathode
   whereby the NO$_2$ in the gas stream is reduced at the cathode; and
   measuring the current across said electrodes without driving a current through said electrodes from an external electrical power source.

4. In a galvanic monitoring process for a gas stream containing NO, the steps comprising:
   providing a platinum cathode and an anode joined by a neutral buffered halide electrolyte, said anode being formed of active carbon;
   converting the NO in said gas stream to NO$_2$;
   conveying said gas stream containing NO$_2$ directly to the cathode whereby the NO$_2$ is reduced at the cathode; and
   measuring the current across said electrodes without driving a current through said electrodes from an external electrical power source.

5. A galvanic cell as set forth in claim 9 wherein said cathode is a laminated structure comprising at least two layers of platinum screen separated by a liquid-absorbent material.

6. A galvanic cell adapted to monitor a gas sample containing an odd electron nitrogen oxide comprising:
   a cell having an inlet and an outlet whereby a stream of gas sample may pass through said cell;
   said cell being adapted to hold a predetermined level of electrolyte and said inlet and outlet being disposed above said level;
   a cathode formed of a laminated structure including a platinum screen and a layer of liquid-absorbent material, the major portion of said cathode being substantially vertically disposed in said cell with said cathode having portions disposed both above and below said predetermined level;
   an anode of active carbon spaced from said cathode in said cell; and
   circuit means connected to said electrodes, said circuit means being devoid of an electrical power source associated therewith other than said electrodes for driving a current through said electrodes.

7. A galvanic cell adapted to monitor a gas sample containing NO$_2$ comprising:
   a substantially horizontally disposed elongated cell having inlet and outlet ports at opposite ends of said cell;
   said cell being adapted to hold a predetermined level of electrolyte and said inlet and outlet ports being disposed above said level;
   a cathode formed of a laminated structure comprising two platinum screens separated by a liquid-absorbent material, said cathode extending substantially the length of said cell and being folded upon itself along its longitudinal extent and disposed substantially vertically in said cell with portions positioned both above and below said predetermined level;
   an anode chosen from the group consisting of active carbon and silver spaced from said cathode in said cell; and
   means for connecting said anode and said cathode to a current measuring means.

8. A galvanic cell adapted to monitor a gas sample containing nitrogen oxide comprising:
   a cell having an inlet and an outlet whereby a stream of gas sample may pass through said cell;
   said cell being adapted to hold a predetermined level of electrolyte and said inlet and outlet being disposed above said level;
   a cathode of platinum screen extending substantially the length of said cell and having portions disposed above and below said predetermined level;
   an anode of active carbon spaced from said cathode in said cell; and
   circuit means connected to said electrodes, said circuit means being devoid of an electrical power source associated therewith other than said electrodes for driving a current through said electrodes.

9. A galvanic cell adapted to monitor a gas sample containing NO$_2$ comprising:
   a substantially horizontally disposed elongated cell having inlet and outlet ports at opposite ends of said cell;
   said cell being adapted to hold a predetermined level of electrolyte and said inlet and outlet ports being disposed above said level;
   a cathode of platinum screen extending substantially the length of said cell, said screen having a plurality of substantially vertically disposed portions extending the length of said screen with a substantial part of said portions being positioned above said predetermined level with the remainder of said portions being disposed below said predetermined level;

an anode chosen from the group consisting of active carbon and silver spaced from said cathode in said cell; and means for connecting said anode and said cathode to a current measuring means.

References Cited by the Examiner
UNITED STATES PATENTS

| | | | |
|---|---|---|---|
| 2,651,612 | 9/1953 | Haller | 204—195 |
| 2,805,191 | 9/1957 | Hersch | 204—1.1 |
| 3,003,932 | 10/1961 | Frey et al. | 204—195 |
| 3,028,317 | 4/1962 | Wilson et al. | 204—195 |
| 3,038,848 | 6/1962 | Brewer et al. | 204—195 |
| 3,196,100 | 7/1965 | Digby | 204—195 |
| 3,234,117 | 2/1966 | Rost et al. | 204—195 |
| 3,236,759 | 2/1966 | Robinson | 204—195 |

References Cited by the Applicant

Anonymous: "Detector Monitors Toxic Vapors," Chemical & Engineering News, May 29, 1961, p. 44.

Nicholas A. Poulos: "Amperometric Propellant-Component Detector," ASTIA Report (1961).

Royal E. Rostenbach and Robert G. Kling: "Nitrogen Dioxide Detection Using a Coulometric Method," Journal of the Air Pollution Control Association, vol. 12, No. 10, October 1962, pp. 459–463.

HOWARD S. WILLIAMS, *Primary Examiner.*

JOHN H. MACK, *Examiner.*

T. H. TUNG, *Assistant Examiner.*